(12) United States Patent
Liu et al.

(10) Patent No.: US 12,049,393 B2
(45) Date of Patent: Jul. 30, 2024

(54) FLOATING DEVICE FOR AERIAL WORK PLATFORM

(71) Applicant: HUNAN SINOBOOM INTELLIGENT EQUIPMENT CO., LTD, Hunan (CN)

(72) Inventors: Guoliang Liu, Hunan (CN); Junbo Zhao, Hunan (CN)

(73) Assignee: HUNAN SINOBOOM INTELLIGENT EQUIPMENT CO., LTD, Hunan (CN)

( * ) Notice: Subject to any disclaimer, the term of this patent is extended or adjusted under 35 U.S.C. 154(b) by 0 days.

(21) Appl. No.: 18/277,050

(22) PCT Filed: Dec. 23, 2021

(86) PCT No.: PCT/CN2021/140783
§ 371 (c)(1),
(2) Date: Aug. 11, 2023

(87) PCT Pub. No.: WO2022/193770
PCT Pub. Date: Sep. 22, 2022

(65) Prior Publication Data
US 2024/0043257 A1     Feb. 8, 2024

(30) Foreign Application Priority Data

Mar. 19, 2021   (CN) .......................... 202110295073.8

(51) Int. Cl.
*B60G 9/02* (2006.01)
*B60B 35/00* (2006.01)
(Continued)

(52) U.S. Cl.
CPC .......... *B66F 17/006* (2013.01); *B60B 35/004* (2013.01); *B60G 9/02* (2013.01);
(Continued)

(58) Field of Classification Search
CPC .............. B60G 17/016; B60G 17/0152; B60G 17/01933; B60G 2202/413;
(Continued)

(56) References Cited

U.S. PATENT DOCUMENTS 5,069,302 A * 12/1991 Kageyama ............ B60T 8/4809
                                                                180/197
5,447,331 A *  9/1995 Barnhart ............ B60G 17/0152
                                                                180/41
(Continued)

FOREIGN PATENT DOCUMENTS

CN         201932886 U     8/2011
CN         205047557 U     2/2016
(Continued)

OTHER PUBLICATIONS

International Search Report and Written Opinion issued in International Application No. PCT/CN2021/140783, 4 pages.

*Primary Examiner* — Toan C To
(74) *Attorney, Agent, or Firm* — MASCHOFF BRENNAN; Michael Mauriel

(57) ABSTRACT

A floating device for an aerial work platform, comprising a pressure oil source (100), a controller (200), a left floating device, and a right floating device, a chassis (700), and a swing axle (600). The left floating device comprises a left hydraulic cylinder (300), a left balance valve (310), and a left locking device; the right floating device comprises a right hydraulic cylinder (400), a right balance valve (410), and a right locking device; one end of the left hydraulic cylinder (300) and one end of the right hydraulic cylinder (400) are hinged on the chassis (700); the swing axle (600) is hinged with the chassis (700); the other end of the left hydraulic cylinder (300) and the other end of the right hydraulic cylinder (400) are hinged on two opposite ends of the swing axle (600); and the left locking device and the (Continued)

right locking device constitute second-level locking of the left hydraulic cylinder (300) and the right hydraulic cylinder (400), thereby ensuring that the aerial work platform will not tip over due to the sliding of the hydraulic cylinders.

7 Claims, 3 Drawing Sheets

(51) Int. Cl.
 *B60G 17/08* (2006.01)
 *B66F 17/00* (2006.01)
(52) U.S. Cl.
 CPC ...... *B60G 17/08* (2013.01); *B60B 2900/3312* (2013.01); *B60G 2200/322* (2013.01); *B60G 2202/24* (2013.01); *B60G 2204/62* (2013.01); *B60G 2206/41* (2013.01); *B60G 2500/104* (2013.01); *B60G 2800/012* (2013.01); *B60G 2800/9123* (2013.01)
(58) Field of Classification Search
 CPC ............ B60G 2204/62; B60G 2300/00; B60G 2400/204; F16K 31/0603; B66F 11/042; B66F 11/046; B66F 13/00
 See application file for complete search history.

(56) References Cited

U.S. PATENT DOCUMENTS

| | | | | |
|---|---|---|---|---|
| 5,639,119 | A * | 6/1997 | Plate | B62D 49/08 |
| | | | | 280/124.112 |
| 6,761,371 | B1 * | 7/2004 | Heyring | B60G 21/06 |
| | | | | 280/124.159 |
| 8,276,705 | B2 * | 10/2012 | Sumiyoshi | E02F 9/02 |
| | | | | 188/152 |
| 9,020,698 | B2 * | 4/2015 | Iwami | B60G 17/0152 |
| | | | | 701/37 |
| 11,192,424 | B2 * | 12/2021 | Tabata | B60G 21/073 |
| 11,623,493 | B2 * | 4/2023 | Clark | B66F 9/22 |
| | | | | 280/5.5 |
| 2009/0020966 | A1 * | 1/2009 | Germain | B60G 21/0555 |
| | | | | 280/124.106 |
| 2013/0090808 | A1 * | 4/2013 | Lemme | B60G 17/0432 |
| | | | | 280/124.159 |
| 2014/0379215 | A1 * | 12/2014 | Kikuchi | B60G 17/018 |
| | | | | 701/37 |
| 2016/0200164 | A1 * | 7/2016 | Tabata | B60G 21/073 |
| | | | | 280/5.508 |

FOREIGN PATENT DOCUMENTS

| | | |
|---|---|---|
| CN | 113003501 A | 6/2021 |
| GB | 1482399 A | 8/1977 |

\* cited by examiner

FLOATING DEVICE FOR AERIAL WORK PLATFORM

CROSS REFERENCE TO RELATED APPLICATIONS

This application is a U.S. National Phase application under 35 U.S.C. § 371 of International Application No. PCT/CN2021/140783 filed on Dec. 23, 2021 and claims priority to Chinese Application No. 2020110295073.8 filed on Mar. 19, 2021. The entire contents of these applications are hereby incorporated herein by reference.

FIELD OF THE INVENTION

This application relates to the field of engineering machinery, in particular to a floating device for an aerial work platform.

BACKGROUND OF THE INVENTION

The aerial work platform is a lifting mechanical equipment for aerial work maintenance. The product has the characteristics of stable structure, flexible movement, stable lifting, convenient operation and large load capacity, which provides convenience for aerial work units. When the aerial work platform is working, the platform car is first moved to the right position, adjusted to the level, and then fixed, the platform car performs elevating operation. One function that the aerial work platform needs to rely on during the moving process and adjustment to the level process is the whole vehicle floating of the aerial work platform.

The whole vehicle floating of the aerial platform is realized by adding a floating oil cylinder on the swing axle, one end of the oil cylinder is connected to the frame, and the other end is connected or pressed against the swing axle. Each end of the swing axle is equipped with an oil cylinder. By controlling the extension of the oil cylinder on one side of the swing axle, the swing of the swing axle can swing, while the other side of the swing axle will drive the other oil cylinder to retract. The floating oil cylinder can ensure the rapid action of the oil cylinder and adapt to the change of the ground in time, so that the four tires of the whole vehicle touch the ground and maintain a good driving force.

In the related technology, when the aerial platform is in the working state, the method of locking the floating cylinder is generally used to ensure the safety of the whole machine, because the position of the floating cylinder is uncertain during the floating, it is easy to cause safety accidents such as overturning, and when locking the floating cylinder, the locking failure of the hydraulic cylinder, the leakage of the hydraulic oil, and the sliding of the cylinder may cause the aerial platform to overturn to cause casualties.

SUMMARY OF THE INVENTION

The invention aims to solve at least one of the technical problems in the prior art. To this end, the present invention proposes a floating device for an aerial work platform, which can solve the problem of overturning of the whole aerial platform caused by the locking failure of the hydraulic cylinder, the leakage of the hydraulic oil and the sliding of the hydraulic cylinder.

According to the embodiment of the invention, a floating device for an aerial work platform comprising a pressure oil source, a controller, a left floating device, a right floating device, a frame and a swing axle; the left floating device, comprising a left hydraulic cylinder, a left balance valve, and a left locking device, the left balance valve is set on an oil port of the left hydraulic cylinder, the left balance valve is connected with the pressure oil source through the left locking device, and the control ends of the left locking device and the control ends of the left balance valve are both connected with the controller;

the right floating device, comprising a right hydraulic cylinder, a right balance valve, and a right locking device, the right balance valve is set on an oil port of the right hydraulic cylinder, the right balance valve is connected with the pressure oil source through the right locking device, and the control ends of the right locking device and the control ends of the right balance valve are both connected with the controller; one end of the left hydraulic cylinder and one end of the right hydraulic cylinder are hinged on the frame; the swing axle is hinged with the frame, the other end of the left hydraulic cylinder and the other end of the right hydraulic cylinder are hinged on two opposite ends of the swing axle.

According to the embodiment of the invention, a floating device for an aerial work platform has at least the following beneficial effects:

The implementation method of the invention is by setting the left hydraulic cylinder which is in the left floating device and the right hydraulic cylinder which is in the right floating device respectively at both ends of the swing axle, the swing axle is hinged on the frame, and the controller realizes the floating and locking of the left hydraulic cylinder and the right hydraulic cylinder by controlling the switches of the left balance valve and the left locking device of the left floating device, and the right balance valve and the right locking device of the right floating device, so as to realize the floating and fixing of the swing axle; the left balance valve is set on the oil port of the left hydraulic cylinder, the left balance valve is connected to the pressure oil source through the left locking device; the right balance valve is set on the oil port of the right hydraulic cylinder, the right balance valve is connected to the pressure oil source through the right locking device; the control ends of the left locking device, the left balance valve, the right locking device and the right balance valve are all connected to the controller, the pressure oil source provides pressure oil for the action of the left hydraulic cylinder and right hydraulic cylinder, and replenish pressure oil for the left and right hydraulic cylinders in the floating state; the controller controls the opening or closing of the left locking device, the left balance valve, the right locking device and the right balance valve. When the controller controls the left locking device, left balance valve, right locking device, and right balance valve to open, the oil circuit of the left hydraulic cylinder and the right hydraulic cylinder is connected to form a floating circuit, at this time, the left hydraulic cylinder and the right hydraulic oil push the swing axle up and down under the combined action of the pressure oil and the ground, so that the four tires of the whole vehicle are always tightly attached to the ground, and the whole vehicle is in a floating state; when the controller is closed, the left locking device, the left balance valve, the right locking device and the right balance valve are closed, the left balance valve and the right balance valve play the first-level of oil circuit locking effect on the left hydraulic cylinder and the right hydraulic cylinder respectively, while the left locking device and the right locking device play the second-level of oil circuit locking effect on the left hydraulic cylinder and the right hydraulic cylinder respectively; the left hydraulic cylinder and the right hydraulic cylinder are locked, and at the moment, the swing axle is in a fixed state; when the left balance valve and the right balance valves fail, that is, when the left and right hydraulic cylinder locks fail, the left locking device and the right locking device can still play the role of locking the oil circuit, which can effectively prevent the locking failure, hydraulic oil leakage and cylinder sliding of the left hydraulic cylinder and the right hydraulic cylinder.

According to some embodiments of the invention, the controller is a control oil source.

According to some embodiments of the invention, the left locking device and the right locking device are both hydraulic control check valves.

According to some embodiments of the invention, the left locking device and the right locking device are both hydraulic control reversing valves.

According to some embodiments of the invention, the left hydraulic cylinder and the right hydraulic cylinder are single-acting hydraulic cylinders.

According to some embodiments of the invention, a rotating shaft is set on the frame, and the swing axle is hinged on the frame through the rotating shaft.

According to some embodiments of the invention, the rotating shaft is set on the center line of the frame.

Additional aspects and advantages of the invention will be given in part in the following description, some of which will become apparent from the following description, or may be learned through practice of the invention.

BRIEF DESCRIPTION OF THE DRAWINGS

The following is a further explanation of the invention in combination with drawings and implementation examples, wherein.

Figure 1:
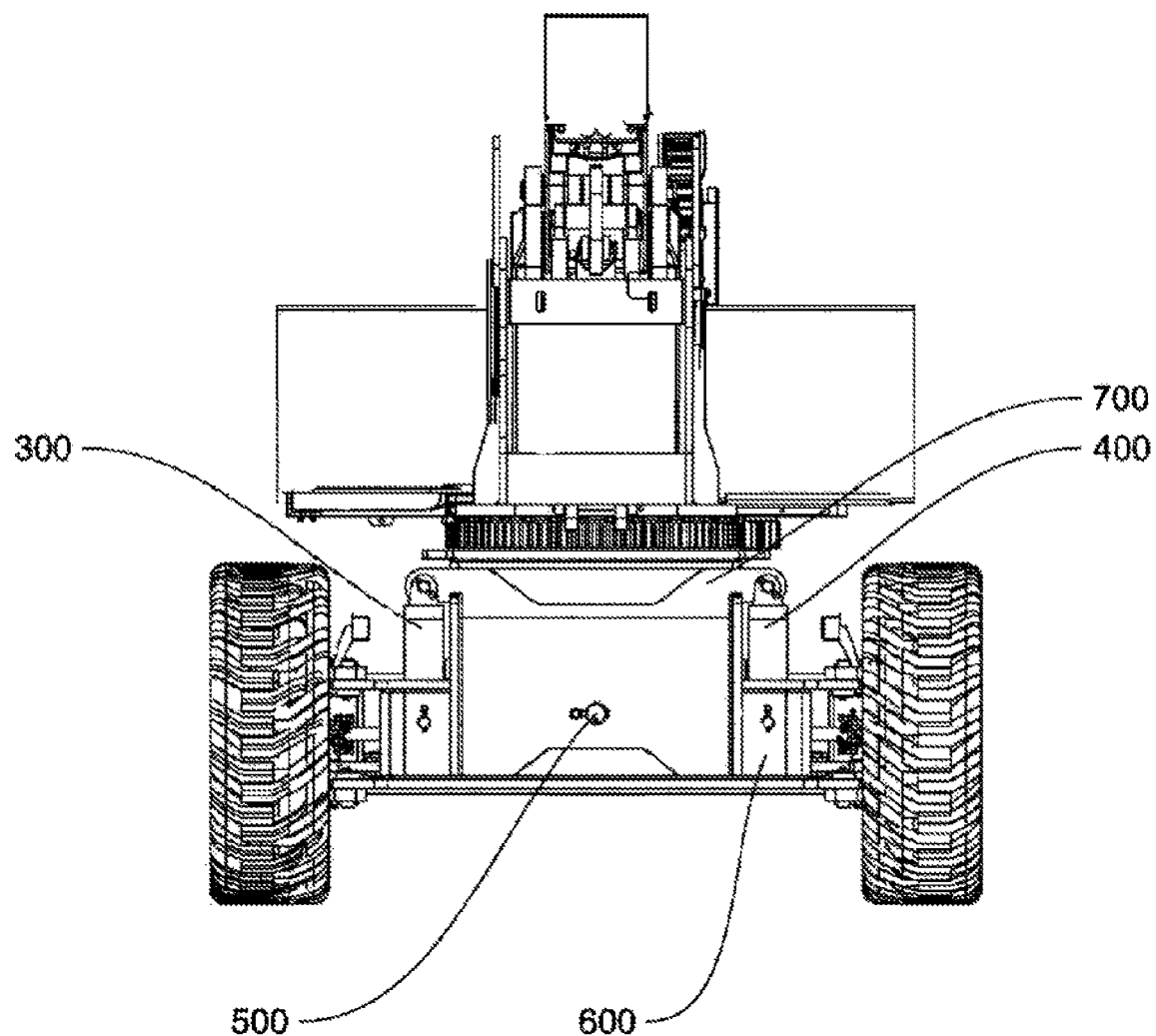
FIG. 1 is a front view of an embodiment of the present invention.
Figure 2:
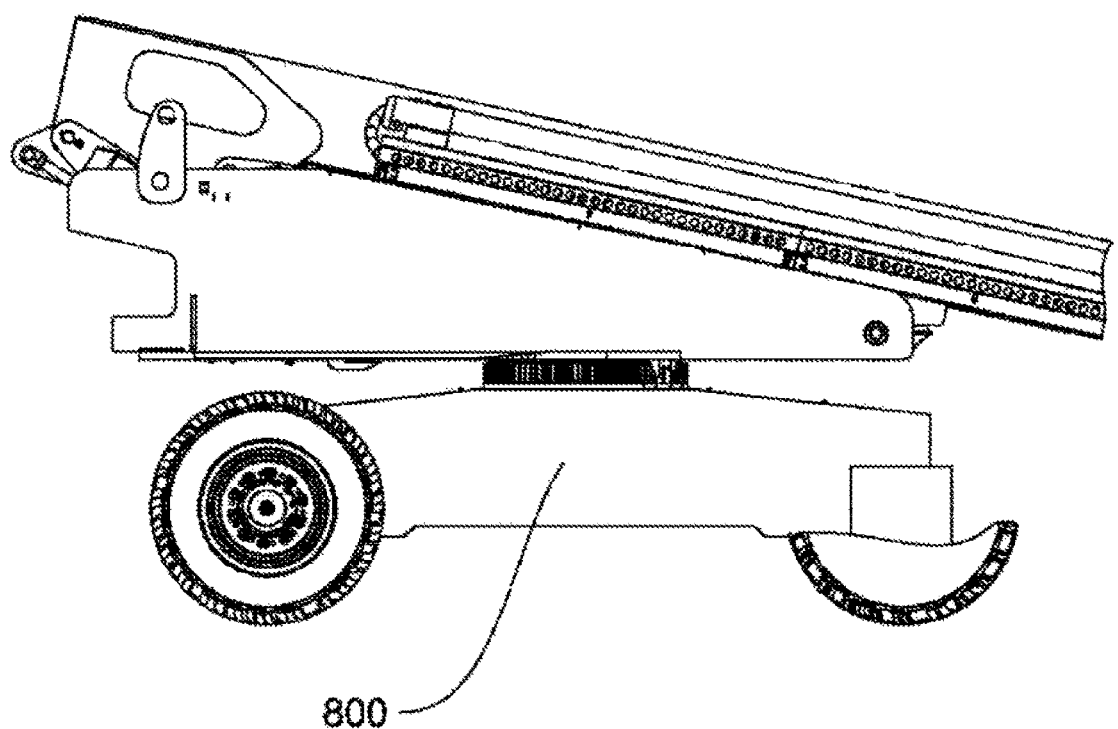
FIG. 2 is a side view of an embodiment of the present invention.

Reference numerals: pressure oil source 100, controller 200, left hydraulic cylinder 300, left balance valve 310, left hydraulic control check valve 320, left hydraulic control reversing valve 330, right hydraulic cylinder 400, right balance valve 410, right hydraulic control check valve 420, right hydraulic control reversing valve 430, rotating shaft 500, swing axle 600, frame 700.

DETAILED DESCRIPTION OF THE EMBODIMENTS

Embodiments of the present invention will be described in detail below. Examples of the embodiments are shown in the accompanying drawings. The same or similar reference signs throughout the drawings denote the same or similar elements or elements having the same or similar functions. The embodiments described below by reference to the accompanying drawings are exemplary, are intended for explanation only, and are not to be construed as limiting the present invention.

In the description of the present invention, it should be understood that references to orientation descriptions, such as up, down, front, back, left, right, etc. indicated orientations, are intended only for ease of description of the present invention and for simplification of description, and are not intended to indicate or imply that the device or element indicated must have a particular orientation, be constructed and operate in a particular orientation, and therefore cannot be construed as limiting to the present invention.

Reference throughout this specification to "an embodiment", "some embodiments", "an exemplary embodiment", "an example", "a specific example", or "some examples" means that a particular feature, structure, material, or characteristic described in connection with the embodiment or example is included in at least one embodiment or example of the present invention. Thus, the above terms throughout this specification do not necessarily refer to the same embodiment or example. Moreover, the described specific features, structures, materials or characteristics can be combined in any one or more embodiments or examples in a suitable manner.

Please refer to FIG. 1 to FIG. 4, the floating device for an aerial work platform according to the embodiment of the invention comprises a frame 700, a swing axle 600, a left floating device and a right floating device; the swing axle 600 is hinged on the frame 700, the two ends of the swing axle 600 are connected to the tire, the touchdown of the tire can be controlled to realize the floating of the frame 700 by controlling the rotation of the swing axle 600; the left floating device is installed on the left side of the swing axle 600, the left floating device comprises a left hydraulic cylinder 300, a left balance valve 310, a left locking device, a pressure oil source 100 and a controller 200, the left balance valve 310 is set on an oil port of the left hydraulic cylinder 300, the left balance valve 310 is connected with the pressure oil source 100 through the left locking device, and the control end of the left locking device and the control end of the left balance valve 310 are connected with the controller 200; the right floating device is installed on the right side of the swing axle 600, the right floating device comprises a right hydraulic cylinder 400, a right balance valve 410, a right locking device, a pressure oil source 100 and a controller 200, the right balance valve 410 is set on an oil port of the right hydraulic cylinder 400, the right balance valve 410 is connected with the pressure oil source 100 through a right locking device, and the control end of the right locking device and the control end of the right balance valve 410 are connected with the controller 200; one end of the left hydraulic cylinder 300 is hinged to the frame 700, the other end of the left hydraulic cylinder 300 is hinged to the left side of the swing axle 600; one end of the right hydraulic cylinder 400 is hinged to the frame 700, and the other end of the right hydraulic cylinder 400 is hinged to the right side of the swing axle 600; when the left balance valve 310, the left locking device, the right balance valve 410 and the right locking device are all open, the oil cavity of the left hydraulic cylinder 300 and the right hydraulic cylinder 400 is connected, and the oil is replenished to the left hydraulic cylinder 300 and the right hydraulic cylinder 400 through the pressure oil source 100, at this time, the frame 700 is in a floating state, that is, when the swing axle 600 rotates with the ups and downs of the terrain, the left hydraulic cylinder 300 and the right hydraulic cylinder 400 stretch or shrink with the movement of the two ends of the swing axle 600, so as to realize the floating of the frame 700. When the frame 700 does not need to float, the operator operates the controller 200, closes the left locking device, the left balance valve 310, the right locking device and the right balance valve 410, thereby the oil circuits of the left hydraulic cylinder 300 and the right hydraulic cylinder 400 are locked, making the left hydraulic cylinder 300 and the right hydraulic cylinder 400 unable to operate, thus locking the swing axle 600, making the swing axle 600 unable to rotate, and then the frame 700 is fixed; and when the left balance valve 310 fails or the hydraulic oil leaks, the left locking device can ensure the locking state of the left hydraulic cylinder 300 and ensure that the left hydraulic cylinder 300 will not slide. When the right balance valve 410 fails or the hydraulic oil leaks, the right locking device can ensure the locking state of the right hydraulic cylinder 400 and ensure that the right hydraulic cylinder 400 does not slide. The left locking device and the right locking device are used as the second-level locking of the left hydraulic cylinder 300 and the right hydraulic cylinder 400 respectively, which can effectively prevent the locking failure, hydraulic oil leakage and cylinder sliding of the left hydraulic cylinder 300 and the right hydraulic cylinder 400, and ensure the stability of the frame 700.

Figure 3:
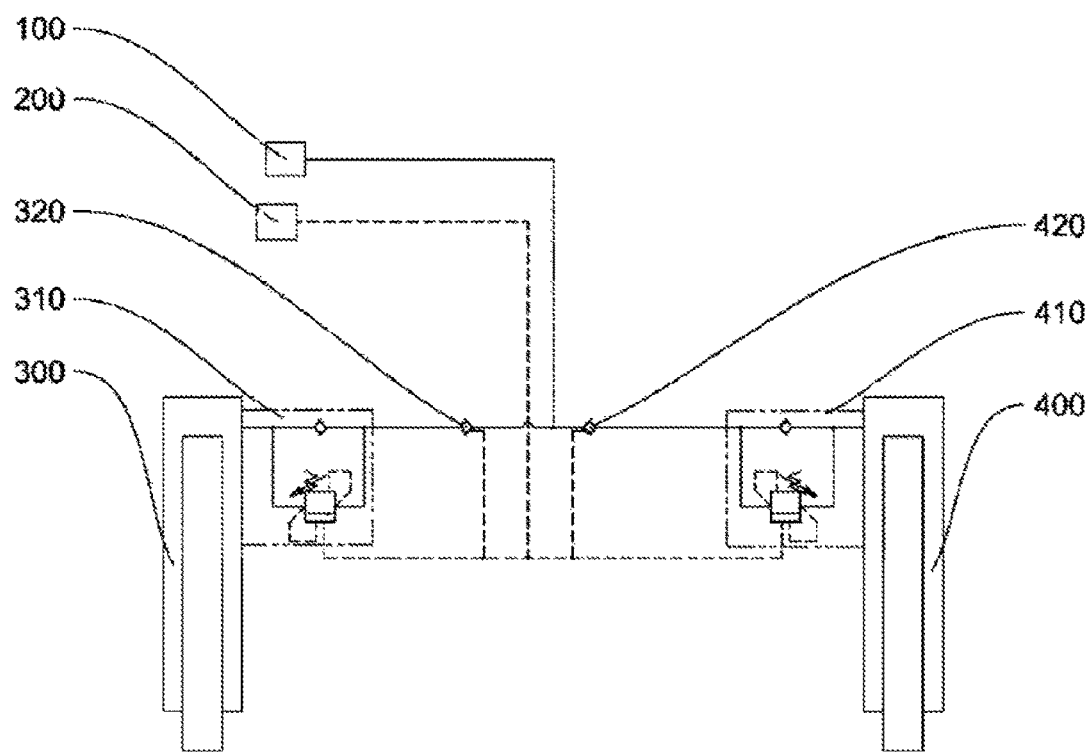
FIG. 3 is a hydraulic schematic diagram using a hydraulic control check valve as a locking device according to an embodiment of the present invention.

Among them, the controller 200 is the control oil source, the left balance valve 310, the right balance valve 410, the left locking device and the right locking device are all hydraulic control devices; as shown in FIG. 3, both the left locking device and the right locking device are hydraulic control check valves; the controller 200 is operated to open the left hydraulic control check valve 320, the left balance valve 310, the right hydraulic control check valve 420 and the right balance valve 410, at this time, the oil circuit at both ends of the left hydraulic control check valve 320 and the right hydraulic control check valve 420 is turned on, and the frame 700 is in a floating state; the left hydraulic control check valve 320, the left balance valve 310, the right hydraulic control check valve 420 and the right balance valve 410 are closed, at this time, the oil circuit at both ends of the left balance valve 310 and the right balance valve 410 as the first-level of locking is cut off, and the oil circuit at both ends of the left hydraulic control check valve 320 and the right hydraulic control check valve 420 as the second-level of locking is also cut off, and the frame 700 is in a stable and non-floating state; when the left balance valve 310 and the right balance valve 410 are blocked or the hydraulic oil leaks, the left hydraulic control check valve 320 and the right hydraulic control check valve 420 can still block the oil circuit of the left hydraulic cylinder 300 and the right hydraulic cylinder 400 to prevent the cylinder from sliding.

Figure 4:
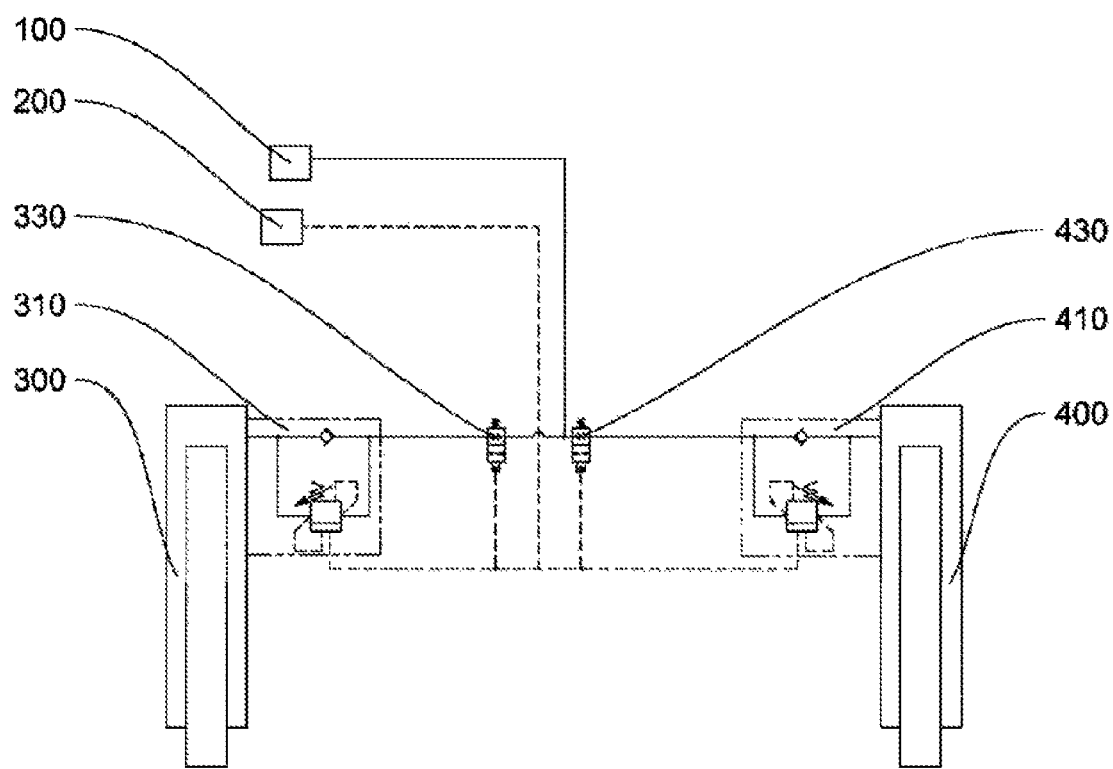
FIG. 4 is a hydraulic schematic diagram of using a hydraulic control reversing valve as a locking device according to an embodiment of the present invention.

As shown in FIG. 4, both the left locking device and the right locking device are hydraulic control reversing valves; the controller 200 is operated to open the left hydraulic control reversing valve 330, the left balance valve 310, the right hydraulic control reversing valve 430 and the right balance valve 410, at this time, the oil circuits at both ends of the left hydraulic control reversing valve 330 and the right hydraulic control reversing valve 430 are turned on, and the frame 700 is in a floating state; the left hydraulic control reversing valve 330, the left balance valve 310, the right hydraulic control reversing valve 430 and the right balance valve 410 are closed, at this time, the oil circuit at both ends of the left balance valve 310 and the right balance valve 410 as the first-level of locking is cut off, and the oil circuit at both ends of the left hydraulic control reversing valve 330 and the right hydraulic control reversing valve 430 as the second-level of locking is also cut off, and the frame 700 is in a stable and non-floating state; when the left balance valve 310 and the right balance valve 410 are blocked or the hydraulic oil leaks, the left hydraulic control reversing valve 330 and the right hydraulic control reversing valve 430 can still block the oil circuit of the left hydraulic cylinder 300 and the right hydraulic cylinder 400 to prevent the cylinder from sliding. Certainly, the controller 200 can also be the electro-hydraulic controller 200, the left balance valve 310, the right balance valve 410, the left locking device and the right locking device can also be electrically controlled; for example, the left locking device and the right locking device are electric control check valves or the left locking device and the right locking device are electric control reversing valves, which all belong to the protection scope of the invention.

Secondly, the left hydraulic cylinder 300 and the right hydraulic cylinder 400 are both single-acting hydraulic cylinders; in the floating state, when the left hydraulic cylinder 300 sucks the hydraulic oil, the left hydraulic cylinder 300 elongates, the left side of the swing axle 600 moves down under the action of the left hydraulic cylinder 300, and the right side of the swing axle 600 moves up under the action of the hinged lever; at the same time, the right hydraulic cylinder 400 is retracted, and the hydraulic oil within the right hydraulic cylinder 400 is extruded, the extruded hydraulic oil is sucked into the left hydraulic cylinder 300, and finally the floating control of the swing axle 600 is realized. The single-acting hydraulic cylinder is simple in floating oil way and reliable in work, and certainly, in addition to using a single-acting hydraulic cylinder, a double-acting hydraulic cylinder can also be used, which belongs to the protection scope of the invention. In addition, a rotating shaft 500 is set on the frame 700, the swing axle 600 is hinged on the frame 700 through the rotating shaft 500, and the rotating shaft 500 is set on the center line of the frame 700; when the left side of the swing axle 600 moves down under the action of the left hydraulic cylinder 300, the right side of the swing axle 600 moves up under the action of leverage, and because the rotating shaft 500 is set on the center line of the frame 700, the upward distance of the right side of the swing axle 600 is the same as the downward distance of the left side of the swing axle 600; meanwhile, it drives the right hydraulic cylinder 400 to shrink, and the amount of the hydraulic oil sucked by the left hydraulic cylinder 300 is the same as the amount of hydraulic oil extruded by the right hydraulic cylinder 400.

In summary, the left locking device and the right locking device constitute the second-level locking of the left hydraulic cylinder 300 and the right hydraulic cylinder 400; the swing axle 600 prevents locking failure and hydraulic oil leakage of the left hydraulic cylinder 300 and the right hydraulic cylinder 400 in a fixed state, it is ensured that the oil cylinder will not slide, and the aerial work platform will not overturn due to sliding of the oil cylinder. The hydraulic control reversing valve and the hydraulic control check valve can conveniently achieve the second-level locking effect of the locking device, and the operation is simple and the locking performance is reliable; the rotating shaft 500 is arranged on the center line of the frame 700 to ensure that the movement of the left side and the right side of the swing axle 600 are equal, to ensure that the hydraulic oil inlet and outlet of the left hydraulic cylinder 300 and the right hydraulic cylinder 400 are kept equal, and improved the stability of the hydraulic system.

The embodiments of the present invention are described in detail above in combination with the drawings, but the present invention would not be limited to these embodiments shown herein, and within the scope of knowledge possessed by ordinary technicians in their technical field, various changes can also be made without departing from the purpose of the present invention. In addition, embodiments of the invention and the features in the embodiments may be combined with each other.

The invention claimed is:

1. A floating device for an aerial work platform, comprising:
    a pressure oil source (100);
    a controller (200);
    a left floating device, comprising a left hydraulic cylinder (300), a left balance valve (310), and a left locking device, the left balance valve (310) is set on an oil port of the left hydraulic cylinder (300), the left balance valve (310) is connected with the pressure oil source (100) through the left locking device, and the control ends of the left locking device and the control ends of the left balance valve (310) are both connected with the controller (200);
    a right floating device, comprising a right hydraulic cylinder (400), a right balance valve (410), and a right locking device, the right balance valve (410) is set on an oil port of the right hydraulic cylinder (400), the right balance valve (410) is connected with the pressure oil source (100) through the right locking device, and the control ends of the right locking device and the control ends of the right balance valve (410) are both connected with the controller (200);
    a frame (700), one end of the left hydraulic cylinder (300) and one end of the right hydraulic cylinder (400) are hinged on the frame (700);
    a swing axle (600), the swing axle (600) is hinged with the frame (700), the other end of the left hydraulic cylinder (300) and the other end of the right hydraulic cylinder (400) are hinged on two opposite ends of the swing axle (600).

2. The floating device for an aerial work platform according to claim 1, wherein the controller (200) is a control oil source.

3. The floating device for an aerial work platform according to claim 2, wherein the left locking device and the right locking device are both hydraulic control check valves.

4. The floating device for an aerial work platform according to claim 2, wherein the left locking device and the right locking device are both hydraulic control reversing valves.

5. The floating device for an aerial work platform according to claim 1, wherein the left hydraulic cylinder (300) and the right hydraulic cylinder (400) are single-acting hydraulic cylinders.

6. The floating device for an aerial work platform according to claim 1, wherein a rotating shaft (500) is set on the frame (700), and the swing axle (600) is hinged on the frame (700) through the rotating shaft (500).

7. The floating device for an aerial work platform according to claim 6, wherein the rotating shaft (500) is set on the center line of the frame (700).

* * * * *